United States Patent Office

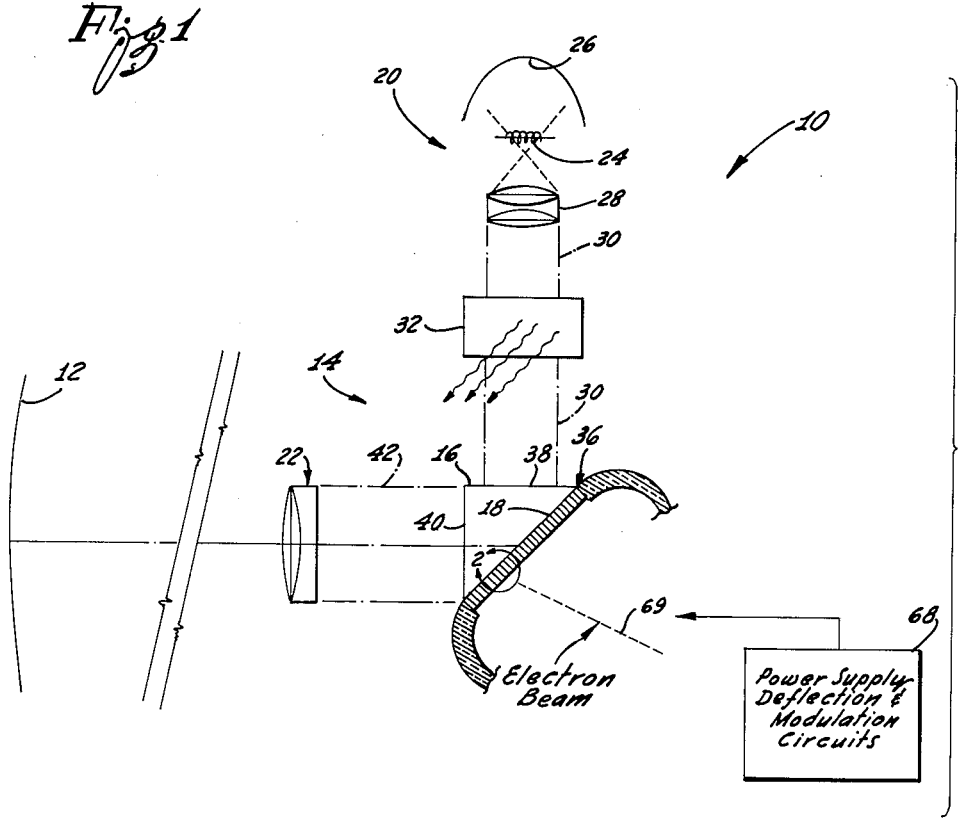

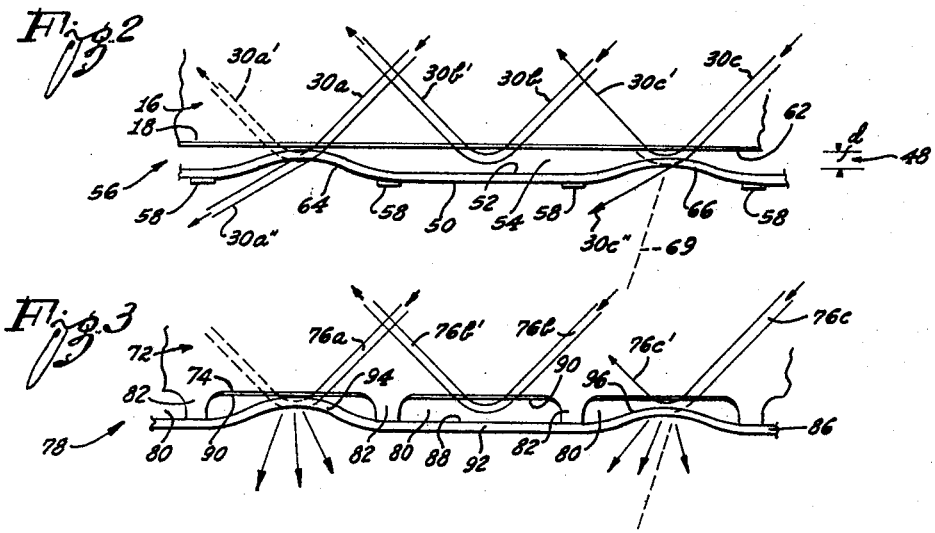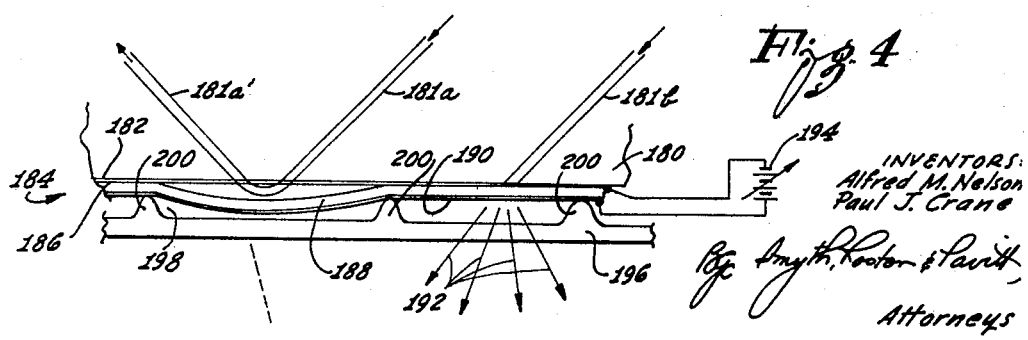

3,238,296
Patented Mar. 1, 1966

3,238,296
DISPLAY SYSTEM
Alfred M. Nelson, Redondo Beach, and Paul J. Crane, Torrance, Calif., assignors to The Magnavox Company, Torrance, Calif., a corporation of Delaware
Filed Mar. 29, 1962, Ser. No. 183,441
4 Claims. (Cl. 178—7.5)

The present invention relates to display means and more particularly to means for projecting enlarged images of high intensity upon a screen.

Heretofore when it has been desired to create a visual image of various objects such as pictures of persons, maps, radar presentations, etc., at the very instant that the particular condition exists, it has been customary to employ a cathode ray type of vacuum tube wherein a layer of phosphors are made to luminesce by means of an electron beam that scans across the layer. Although very good high quality images can be created in this manner, the physical size of a cathode ray tube is severely limited by various factors such as the economic costs, the power requirements, structural problems, etc. As a result, the size of any images that can be created on the face of a cathode ray tube is correspondingly limited. In order to provide images of greater size numerous schemes have been proposed for optically enlarging an image created by a cathode ray tube. Although an image of greater proportions can be obtained in this manner, the amount of light available from the phosphors present on the face of the tube is very limited. As a result, the quality of the enlarged image and particularly the brightness thereof has heretofore been very poor. When large amounts of magnification are required it has been proposed to provide means for creating an image by means of an electronic system and to employ a projection system having a light source which is independent of the electronic system. Theoretically this would permit large amounts of magnification while still providing a bright image. However, as a practical matter such systems have not only been expensive, unreliable and difficult to use but have also been unable to provide images of high quality. Accordingly, heretofore it has been extremely difficult if not impossible to instantly create large size images of high quality and brightness.

It is now proposed to overcome the foregoing difficulties by providing a display system that can instantly project high quality images of virtually unlimited size and brightness. More particularly, it is proposed to provide a display system employing a so called frustrated total reflection technique for creating a visual image and optical means having its own source of light for projecting an enlargement of the image onto a suitable screen. This is to be accomplished by providing an interface between two media together with means for controlling the optical characteristics of the interface so that amount and pattern of the light reflected from the interface will create a visual image. More particularly it is proposed to provide a device such as a prism having a reflective surface on one side thereof and a modulating layer on the surface for controlling the light reflected therefrom. It can be shown mathematically and experimentally that if light is travelling in a first medium so as to be incident upon an interface separating the first medium from a second medium, the light will pass through the interface and into the second medium where the direction of travel will be altered. In the event the angle of incidence of the light on the interface is greater than a critical angle, the light will only penetrate the second medium a distance on the order of a wave length, or so, before the light will change its direction and return through the interface and be reflected therefrom. It may thus be seen that a modulating layer 54 of air or vacuum so to be refracted and continue the interface may be effective to control the pattern of the light reflected therefrom. According to one form of the invention, the modulating layer may include a film such as air or vacuum immediately adjacent the surface of the prism together with means for moving a member through at least a portion of the region penetrated by the light. Moving the surface of the member in such a manner will be effective to modulate the light reflected from the interface. Thus by directing a beam of uniform collimated light onto a reflective surface, the modulating layer will create an optical image that can be projected onto a screen. Although the reflective characteristics of the surface may be modulated by expending very small amounts of energy, the light reflected from the surface may be obtained from a source of illumination that is independent from the modulating means. As a result, the amount of light for projecting the image may be of sufficient intensity to insure a very bright projected image even though it is greatly enlarged while at the same time the power required for modulating the reflective surface is very small.

These and other features and advantages of the present invention will become apparent from the following detailed description, particularly when taken in connection with the accompanying drawings wherein like reference numerals refer to like parts and wherein:

FIG. 1 is a cross sectional view of a display system embodying one form of the present invention.

FIG. 2 is a fragmentary cross sectional view of the portion of the system enclosed within the broken circle in FIG. 1 and showing a reflective surface on a greatly enlarged scale.

FIG. 3 is a view similar to FIG. 2 but shows modifications of the reflective surface.

FIG. 4 is similar to FIGS. 2 and 3 but shows an additional modification of the present invention.

Referring to the drawings in more detail, the present invention is particularly adapted to be embodied in a display system 10 for projecting an enlarged image onto a screen 12. Although this screen 12 may be of any desired character, it is preferably of adequate dimensions to accommodate an image of the required size.

In order to project the image onto the screen 12 an optical projection system 14 may be provided which employs a frustrated total reflection technique. In the present instance, this projection system 14 includes a transparent member 16 having a reflective surface 18, a source 20 of illumination for directing collimated light onto the reflecting surface 18 and a projecting lens 22 for projecting the light reflected from the surface 18 onto a screen 12.

The source 20 of illumination may be of any suitable variety such as an incandescent lamp 24 that will continuously produce a light of the required intensity. In addition, a reflector 26 and set of condensing lenses 28 may be provided for focusing the light into a substantially collimated beam 30 that is directed toward the member 16 so as to be incident on the reflecting surface 18. If desired, a dichromatic infrared reflector 32 may be disposed in substantial alignment with the condensing lenses 28 for separating infrared rays from the visible light. As a result, even though a high intensity beam 30 may be provided, the amount of heat therein will be reduced to a minimum.

The reflective surface 18 may be formed by means of an interface between a first medium having a first index of refraction and a second medium having a second index of refraction. In the present instance the first medium is a transparent refractive glass and the second medium is formed by a modulating means 36. The glass member 16 is preferably formed into a prism having triangular cross sections with three substantially plane surfaces 18, 38 and 40. The first side 38 of the prism 26 is disposed at substantially right angles to the collimated beam 30 so that the beam 30 will pass through the surface 38 with little or no refraction and continue to travel through the prism 16 in substantially the same direction.

The second side 18 of the prism 16 may be disposed in substantial alignment with the collimated beam 30 in the prism 16 so that the light therin will be incident on the internal surface formed by the side 18. The third side 40 is disposed substantially symmetrically with respect to the first side 38. As a result, any of the light reflected from the surface 18 will be incident on the surface 40 at substantially right angles and will emerge from the side 40 as a beam 42 of substantially parallel light rays. The projecting lens 22 is preferably disposed in substantial alignment with this beam 42 and positioned so as to project the light therein onto the screen 12.

The beam 30 may be considered as consisting of a plurality of substantially parallel individual light rays such as 30a, 30b and 30c. As is well known when a ray of light is incident upon an interface formed between a pair of media of two different refractive indices, the ray of light will pas through the interface and into the second medium. In the event the angle of incidence of the light upon the interface is less than a critical angle having a sine equal to the ratio of the refractive indices of the two media, the light will continue to travel through the second medium but in a direction oblique to its original direction. However, if the light is incident on the interface at an angle that equals or exceeds the critical angle, the light will penetrate only a thin region of the second medium and its direction will be changed sufficiently to cause the light to return through the interface and into the first medium whereby the light will be substantially totally reflected from the interface.

It can be shown by means of Maxwell's equations that a ray of light such as 30b incident upon the interface actually passes through the interface and into the material having the lower refractive index before it is reflected substantially as shown in FIG. 2. The light 30b will penetrate only a very thin region 48 of the second medium with the amount of energy present in the region decreasing very rapidly as the distance "d" beyond the interface increases. At a distance on the order of one wave length substantially all of the light will have been reflected. More particularly, the light energy decreases according to the formula $$E = 1/ke^d$$

where "k" is a constant for any given wave length and "d" is the distance from the interface.

It may thus be seen that by modulating one or more of the optical characteristics of the region adjacent the interface the light reflected from the interface may be modulated. Accordingly, it is proposed to provide a suitable modulating means in the region immediately adjacent the exterior surface of the side 18 of the prism that will be effective to control the light present in the region.

In the embodiment shown in FIGURES 1 and 2, the modulating means includes a flexible member or membrane 50 that is disposed immediately adjacent and substantially parallel to the surface 18 on the prism. The inner surface 52 of the membrane 50 is preferably separated from the surface 18 by a thin layer 54 of air or vacuum. As may be seen from the greatly enlarged cross-sectional view of FIG. 2, the exterior surface 18 of the prism 16 and the layer 54 of air or vacuum will form an interface 56 between a first medium (refractive glass) having a high index of refraction and a second medium (air or vacuum) having a low index of refraction. This interface 56 will thus have a critical angle whose sine is equal to the ratio of the refracted indices. If the angle of incidence of a light ray on the surface 18 is less than the critical angle, the light ray will pass into the layer 54 of air or vacuum so to be refracted and continue to travel therethrough. However, if the angle of incidence is equal to or greater than the critical angle, a light ray such as 30b will penetrate into the very thin region 48 of the layer 54 and be returned back through the interface 56 and into the prism 16. The region 48 penetrated by the light ray 30b will have a thickness on the order of a wave length of the light, and the energy level in the region 48 will fall off exponentially as indicated by the above formula.

In order to permit the light in the region 48 to be reflected, the ratio of the refractive indices for the prism 16 and the layer 54 must be sufficiently low to make the angle of incidence of the light beam 30 on the surface 18 greater than the critical angle. Accordingly, when it is desired to permit the reflection of light, the surface 52 of the membrane 50 must be kept outside of the region 48 penetrated by the light. Although there are numerous means for accomplishing this, an electrically conductive grid 58 may be provided on the membrane 50 so that a substantially uniform electrical potential may be distributed across substantially the entire area of the membrane 50.

In addition, an optically transparent but electrically conductive film 62 may be formed on the surface 18 by any suitable means such as vapor deposition, etc. This film 62 may be connected to a second source of potential so that this film may be maintained at a desired potential. As a result, by applying the proper charges to these conductive surfaces, an electrostatic force may be created between the film 62 and the grid 58 on the membrane 50.

If the charges are of opposite polarity and the pressure in the layer 54 is greater than the pressure on the outside of the membrane 50 the air pressure differential will bias the membrane 50 away from the surface 18 while the electrostatic force will tend to oppose this force. Since the repelling force from the potential difference will vary as the square of the spacing between the conductive structures 58 and 62, the entire surface 52 of the membrane 50 will be very precisely separated from the interface 56. Although this spacing may be greater than the thickness of the region 48 so that all of the light in the beam 30 may be reflected, it has been found desirable from a practical standpoint for the surface 52 to only be far enough from the interface to permit a portion of the light to be reflected. The remaining light will enter into the membrane 50.

In order to control the light reflected from the interface 56, the spacing between the surfaces 18 and 52 may be varied. Although this may be accomplished in any desired manner, in the present instance a suitable control circuit 68 is provided for actuating a conventional electron gun so as to cause an electron beam 69 to scan across the membrane 50 and deposit an electrostatic charge onto those portions 64 and 66 of the membrane disposed between the electrically conducted grid 58. This electrostatic charge on the surface of the membrane 50 will correspond to the image to be projected and will react with the charge on the conductive film 62 and produce an additional force that will attract portions 64 and 66 of the membrane 50 toward the interface 56. This force will be effective to move the portions 64 and 66 into the region 48 a sufficient distance to decrease the amount of light being reflected.

The amount of movement of the membrane will correspond to the amount of the charge. As the surface 52 of the membrane 50 moves into the region 48 there will be a gross change in the effective index of the refraction. Thus, if the region 66 is only partially disposed in the region 48, the portion of the energy in the light ray 30c incident on the membrane surface 52 will be absorbed by the membrane 50. This energy will be refracted into the membrane 50 and emerge as light ray 30c''. However, the remaining portions of the energy in beam 30c which are not incident upon the surface 52 will be diverted back through the interface so as to appear to be reflected from the surface 18. As a result the intensity of the ray 30c' will be substantially less than the totally reflected ray 30b'. In the event the electrostatic charge is large enough for example such as at 64, the entire amount of energy in the ray 30a will be refracted through the membrane 50 so as to appear as ray 30a''. As a consequence the reflection of the beam 30a will be totally frustrated and there will be no energy in the ray 30a'.

It may thus be seen that in order to utilize the display system of FIG. 1 for projecting an enlarged image onto the screen 12, the light source 20 is positioned to direct the light beam 30 through the condensing lenses 28 and into the prism 16 so as to be incident upon the reflective surface 18, at an angle that is in excess of the normal critical angle. This light beam 30 will then be reflected from the surface 18 through the projection lenses 22 onto the screen 12. In order to create the desired image, the electron beam 68 may be made to scan across the target area formed by the modulating layer 36 and write an electrostatic charge upon the membrane 50. This electrostatic charge will result in preselected portions such as 64 and 66 moving into the region 48 penetrated by the light incident upon the interface 56. These preselected portions 64 and 66 of the membrane 50 will then absorb varying amounts of the energy in the various light rays 30a and 30c and cause the absorbed light to be refracted through the surface to form rays 30a'' and 30c''. As a consequence, in the areas where the membrane is disposed within the region 48 only a small percentage of the light incident thereon will be reflected from the interface 56.

As a consequence, it may be seen that the light reflected from the interface 56 will have areas of contrasting brilliance corresponding to the image which it is desired to project. Since the intensity of the light incident upon the interface 56 will have little or no effect upon the charge pattern and the positioning of the membrane, the light source 20 may be of virtually unlimited brilliance so as to produce as bright an image as desired.

As an alternative, the embodiment of FIG. 3 may be employed. In this embodiment, a prism 72 is provided that is substantially identical to the prism 16 in the first embodiment in that the prism 16 includes three separate sides and is secured to the end of a cathode ray tube so that one side 74 of the prism 72 will close the end of the tube and form a target area for an electron beam 76 therein. Another side of the prism 72 may be positioned such that a beam of light from a suitable light source may be directed onto this surface such that a plurality of light rays 76a', 76b' and 76c' will be incident upon the reflective side 74 at substantially the critical angle. The third side may then be positioned such that any of the light rays reflected from the side 74 will pass therethrough and into a suitable set of projection lenses for projecting the light onto a screen.

The side 74 of the prism 72 forming the reflective surface is preferably substantially optically flat such that parallel light rays may be reflected therefrom as substantially parallel light rays. A modulating layer 78 is provided on this surface which will be responsive to an electron beam in the vacuum tube so as to modulate the reflected light whereby an image may be projected similar to the foregoing embodiment.

The modulating layer 78 includes a plurality of depressions 80 that extend into the surface a predetermined distance and are separated by a network of ridges 82. Although the depressions 80 may be created in any suitable manner, it has been found that they can be effectively produced by a suitable etching technique. More particularly, a masking screen may be provided on the exterior of the surface so as to cover and protect the ends of the ridges 82 while leaving the areas of the depressions 80 exposed. The prism 72 may then be immersed in a suitable etchant. Since the ridge portions will be protected by the mask they will not be affected by the etchant. However, the exposed portions of the surface will dissolve into the etchant. As a result, the glass in the exposed regions will be removed and the depressions 80 created. Following this, the mask may be removed.

The foregoing etching process is preferably very carefully controlled so that the sizes and shapes of the depressions 80 will be very accurately produced. More particularly the depths of all the depressions are substantially identical and the depth inside each depression is substantially uniform throughout. Each of the depressions preferably has a depth equal to or slightly less than the thickness of the region normally penetrated by the light. By way of example, it has been found a depth on the order of four millionths of an inch deep is suitable. In order to provide a high degree of resolution, it is desirable for the areas formed by the bottoms 84 of the depressions 80 to constitute a large majority of the overall area of the side 74 while the effective areas of the projections 82 are very small. Thus, if a plurality of parallel light rays such as 76b are incident on the bottoms 84 of the depressions 80 they will penetrate into the region formed in the depressions and then be reflected back from the side such as ray 76b'.

A flexible membrane 86 may be secured across the tops of the ridges 82 so as to seal the depressions 80. This membrane 86 preferably consists of a flexible dielectric material. The inner surface 88 of the membrane 86 is preferably normally substantially planular and disposed in the plane of the ridges. If desired, the surface 88 may be light scattering or absorbent so that light incident thereon will be reflected in a different direction or will enter the membrane 86. As a result, the surface 88 will normally be so positioned in the penetrated region that only a small part of the light will be incident thereon and a large part of the light will be reflected. The membrane 86 may consist of any suitable dielectric material such as the membrane in FIG. 2 and may be secured on the ridges 82 in any suitable manner. By way of example, it has been found that the membrane 86 may be vapor deposited or otherwise laid down as a film on an optically flat surface of a substrate such that the film will also have a substantially optically flat surface thereon. The resultant structure may be positioned against the ridges and the film bonded thereto. The film will thus be supported on the ridges 82 and stretched across the depressions 80. Following this, the orginal substrate may be etched or otherwise removed without affecting the dielectric material in the film. This will then leave only the membrane 86 disposed across the depressions.

In order to control the position of the membrane 86a transparent film 90 of conductive material may be provided on the bottoms 84 of the depressions 80 prior to the foregoing operation. This film 90 may then be interconnected with a suitable voltage source that will be effective to maintain any desired potential difference across the spaces formed by the depressions 80.

In order to employ this embodiment, the beam 76 of collimated light rays 76a, 76b, and 76c is projected into the prism so as to be incident on the side 74. The angle of incidence of the rays on the bottoms 84 of the depressions 80 is equal or slightly greater than the critical angle normally formed at the bottoms 84. As a result the light rays incident on the bottoms will pass into the regions in the bottoms of the depressions and normally be returned back through the bottoms 84 and to the projection lenses whereby the light rays may be focused onto the screen. The electron beam may then be scanned across the dielectric membrane 86 to create a desired electrical charge pattern thereon. The portions such as 92 of the membrane 86 not having an electrical charge thereon will remain in their normal spaced relation to the bottom of the depression. However, the portions such as 94 or 96 of the membrane having an electron charge thereon will be attracted toward the conductive film 90 on the bottoms 84 of the depressions 80. This will attract the membrane 86 such that the surface of portion 94 will move completely across the region penetrated by the light while the surface of portion 96 will move only partially across the region. A light ray such as 76a will penetrate into the membrane 86 and be totally prevented from returning back into the prism 72. Similarly only a controlled fraction of the light incident on portion 96 will be reflected as a weak ray 76c'. The membrane 86 is preferably translucent so that the light incident thereon will pass therethrough and be dispersed on the opposite side as random rays.

It may thus be seen that by applying an electrostatic charge on the membrane 86 the light reflected from the side 74 may be modulated to form an optical image having portions of contrasting brilliance whereby the resultant image may be projected upon the screen.

As a further alternative, the embodiment of FIG. 7 may be employed. In this embodiment, a prism 180 is provided that is substantially identical to the preceding prisms. That is, the prism 180 is adapted to be mounted on the end of a cathode ray tube whereby a beam of collimated light rays 181a and 181b may be directed upon one side so as to be reflected from a surface 182 on a second side and through a third side whereby the reflected light may be projected onto a screen by a suitable projecting lens system.

The reflecting side 182 of the prism 180 is preferably substantially optically flat and has a modulating layer 184 thereon for controlling the light reflected from the surface 182. The present modulating layer 184 includes a conductive film 186 that is bonded directly to the surface of the prism 180. This film 186 is preferably transparent and thinner than the region normally penetrated by the beams of light 181a and 181b passing through the interface formed at the surface 182. As a result, practically all of the light incident on the surface will pass through the film 186 before it is reflected or refracted.

The modulating layer 184 also includes a membrane 188 having a second conductive film 190 thereon. The membrane 188 is preferably transparent and flexible so that it may be positioned against the conductive film 186 in intimate contact therewith. The index of refraction of this membrane compared to the index of refraction of the prism 180 is such that the critical angle formed at the surface 182 will be greater than the angle of incidence of the light rays 181. Or the membrane 188 may have a light absorbing surface so that light incident on the surface will enter the membrane. Thus, if the membrane 188 is disposed in the region penetrated by the light rays, the light rays will be refracted into and through the membrane. The surface of the membrane 188 and the film 190 may be such that the light will be dispersed as a plurality of scattered rays 192.

In order to insure that the membrane is retained against the film 182 the films 182 and 190 may be connected to the opposite sides of a potential source 194. This source 194 will be effective to produce potential charges of opposite polarity on the two films and will thereby insure an attractive force for biasing the flexible membrane 188 toward the fixed film 186. Thus the membrane 188 will normally cling to the surface and be retained in the region penetrated by the light whereby no light will be reflected from the surface 182.

To produce a bright spot to be projected onto the screen, the membrane 188 may be moved away from the film 186. In the present instance this is accomplished by means of a dielectric layer 196 that is separated from the membrane 188 by a small clearance space 198. In order to insure the existence of the clearance space 198 a plurality of uniform spacers may be positioned between the layer 196 and membrane 188. These spacers may be structures such as a screen or mesh. In the present instance a plurality of nodules 200 of uniform height are formed on the layer 196 so as to project from the layer 196 and bear against the film 186. If desired, the layer 196 may be permanently bonded to the conductive film 190 on the membrane 188.

In order to employ the present embodiment, the beam of collimated light rays 181a and 181b may be projected through the prism 180 onto the surface 182. A light ray such as 181b will normally pass through the film 186 and into the membrane 188. Since the angle of incidence of the light ray 181b is less than the critical angle formed by the membrane 188 and prism 180, the light ray 181b will be dispersed as rays 192. Thus normally little or no light will be reflected from the surface 182 and the screen will be dark. An electron beam 202 in the cathode ray tube may be made to scan across the layer 196 and lay down an electron charge thereon corresponding to the bright portions of the image to be projected. This charge will react with the conductive film 190 on the membrane 188 and produce a force thereon. This force will tend to attract the membrane 188 toward the layer 196 and move it away from the surface 182 and into the clearance space 198. By adjusting the potential from the source 194 the intensity of the electron charge required to produce the desired motion may be varied. The membrane will then be outside of the region penetrated by a ray such as 181a. Since the angle of incidence will now be greater than the critical angle, the light will be reflected as ray 181a' and form a bright spot on the screen.

It may thus be seen that a projection facsimile system has been provided that will be effective to virtually instantly create a visual image and to project an enlargement thereof onto a screen. Since the light that is employed for projecting the image is external and separate from the means for creating the image, there is virtually no limit to the extent that the image may be enlarged nor to the brightness of the projected image. Although only a limited number of embodiments to the present invention have been disclosed, it will be readily apparent to those skilled in the art that numerous changes and modifications may be made thereto without departing from the present invention. For example, any of one or more of the various well known physical effects may be employed for modulating a reflective interface and the means for producing the physical effects may be of any suitable variety. Accordingly the foregoing disclosure is merely for illustrative purposes and does not in any way limit the invention which is defined only by the claims which follow.

What is claimed is:

1. A device of the class described comprising the combination of:
   a member consisting of a transparent material and having an internally reflective plane surface on one side, said material having an index of refraction such that light traveling through said member and incident on said surface will be internally reflected by emerging from said surface into a region immediately adjacent said surface and returning through said surface into said member,
   an electrically conductive film secured to said surface, said film being optically transparent and disposed within said region such that said light will emerge from said film when being internally reflected from said surface,
   means for producing an electrical charge on said film,
   a layer of a second material disposed immediately adjacent said surface, said layer having a surface that is movable into and out of said region such that light incident on said layer will be absorbed thereby, and
   means for applying an electrical charge pattern to predetermined portions of said layer, said charge pattern being effective to react with the charge on said film for moving at least portions of said layer at least partially through said region to modulate the light reflected from said surface.

2. A device of the class described comprising the combination of:
  a transparent prism of a material with a first index of refraction and having a substantially plane surface on one side thereof that will internally reflect light incident thereon,
  a flexible membrane,
  a pair of electrically conductive films disposed on the opposite sides of said membrane, one of said films being secured to the plane surface on said prism, the other of said films being secured to said membrane, said films when electrically charged being effective to bias said membrane into intimate contact with said surface whereby light internally incident on said surface will normally be refracted through said surface and into said membrane, and
  means for producing an electrical charge pattern on at least one of said films that will react with preselected portions of the film on the membrane to thereby move the film and membrane out of the region the light incident on said surface penetrates whereby incident light will be reflected from said portions.

3. A device of the class described comprising the combination of:
  a member consisting of a transparent material and having an internally reflective plane surface on one side, said material having an index of refraction thereof such that light traveling through said member and incident on said surface will be internally reflected by emerging from said surface into a region immediately adjacent said surface and returning through said surface into said member,
  an electrically conductive film secured to said surface, said film being optically transparent and disposed within said region such that said light will emerge from said film when being internally reflected from said surface,
  means for producing an electrical charge on said film,
  a layer of a second material having a second surface thereon,
  means for positioning the second surface immediately adjacent said first surface and just outside of said region so that portions of said surface are movable into and out of said region such that light incident on said layer will be absorbed thereby, and
  means for applying an electrical charge pattern to predetermined portions of said layer, said charge pattern being effective to react with the charge on said film for moving at least portions of said layer at least partially through said region to modulate the light reflected from said surface.

4. A device of the class described comprising the combination of:
  a member consisting of a transparent material and having an internally reflective surface on one side thereof, said member having a first index of refraction such that light traveling through said member and incident on said surface will be internally reflected by emerging from said surface and traveling through a region immediately adjacent said surface and then returning through said surface into said member,
  an electrically conductive film secured to said surface, said film being optically transparent and disposed within said region such that said light will emerge from said film when being internally reflected from said surface,
  means for producing an electrical charge on said film,
  a pliable film having a second index of refraction and a second surface thereon, said film normally being positioned to separate said surfaces by a gaseous space to permit said second surface being movable in opposite directions through said space and into and out of said region, the pressure in said space differing from the pressure on the opposite side of said film to bias said film in one of said directions, and
  means for selectively creating an electrical charge pattern on said film that reacts with said first charge to bias said portion of said film in the opposite of said directions.

References Cited by the Examiner

UNITED STATES PATENTS

| | | | |
|---|---|---|---|
| 2,185,379 | 1/1940 | Myers et al. | 178—7.5 XR |
| 2,281,280 | 4/1942 | Gabor | 178—7.5 XR |
| 2,510,846 | 6/1950 | Wikkenhauser | 178—7.5 XR |
| 2,681,423 | 6/1954 | Auphan | 315—12 XR |
| 2,910,532 | 10/1959 | Auphan | 178—7.5 |

OTHER REFERENCES

A.P.C. application of Paehr, Serial No. 354,771, published May 18, 1943.

DAVID G. REDINBAUGH, *Primary Examiner.*